Aug. 3, 1965 R. B. MacCALLUM ETAL 3,198,603

METHOD FOR PRODUCING FERRIC OXIDE PARTICLES

Filed June 19, 1962

Robert B. MacCallum
&
FORREST R. HURLEY
Inventors

By Kenneth E. Prince
Attorney

United States Patent Office 3,198,603

Patented Aug. 3, 1965

3,198,603

METHOD FOR PRODUCING FERRIC OXIDE PARTICLES

Robert B. MacCallum, Fairfield, Conn., and Forrest R. Hurley, Ellicott City, Md., assignors to W. R. Grace & Co., New York, N.Y., a corporation of Connecticut Filed June 19, 1962, Ser. No. 203,629

2 Claims. (Cl. 23—200)

Figure 1:

This invention relates to new and useful improvements in the manufacture of ferric oxide sols. Especially, this invention relates to a process for making ferric oxide sols in which the particles comprising the sols are discrete and uniform in size and shape. In one specific aspect, this invention relates to the preparation of acicular, or fibrous, particles of ferric oxide less than one micron in length via sol formation. In another aspect, this invention relates to the preparation of uniform size, elongated spherical particles of ferric oxide from 50 $m\mu$ to 150 $m\mu$ in length via sol formation.

Magnetic sound recorder tapes and many other electronic devices use a ferromagnetic material, usually magnetic iron oxide, impregnated, coated, or imprinted in the case of magnetic inks, on a non-magnetic base such as paper or tape. The most satisfactory form for either $\gamma$-$Fe_2O_3$ or $Fe_3O_4$ magnetic iron oxide is small, acicular particles. This size and shape is characteristic of the magnetic iron oxides possessing the best magnetic properties and also allows a more continuous and more uniform covering of the base.

Other uses for ferric oxide include pigments for rubber, paints, paper, linoleum, and ceramics. The high-grade powder obtained from ferric oxide sols is used as a polishing agent for glass, precious metals, and diamonds. As well, it is used in the manufacture of magnetic materials such as ferrites and garnets.

The literature is replete with references to ferric oxide sol preparation in which a solution of a ferric salt is added slowly to boiling water. Most of these investigators chose to work in very dilute solutions ($<1\%$ $Fe_2O_3$) which have minimal commercial interest. It has been found that the particles formed by the prior art are not dense, discrete particles uniform in shape and size; in fact, the converse is true.

It is an object of this invention to prepare ferric oxide sols in which the particles are small, discrete, and uniform in size and shape.

It is a further object of this invention to provide a method of making small, acicular ferric oxide particles suitable for use in electronic devices described above after a phase transformation to $\gamma$-$Fe_2O_3$ or reduction to $Fe_3O_4$ or $Fe°$.

This invention is based on the discovery that discrete, dense particles, uniform in size and shape can be prepared at concentrations of 1% $Fe_2O_2$ and greater by refluxing a solution of ferric chloride and a buffering agent.

Solutions of ferric salts tend to hydrolyze even in the cold to give hydrous ferric oxide and the corresponding strong acid, in accordance with the following reaction:

$$FeCl_3+3H_2O \rightarrow Fe(OH)_3+3HCl$$

On aging, the hydrous ferric oxide loses water and crystallizes as $\alpha$-$Fe_2O_3$, hematite. Both aging and hydrolysis are accelerated by increased temperature. Therefore higher temperatures are needed for particle densification. But the concomitant effect of the temperature on the hydrolysis rate creates problems in controlling the rate of nucleation and particle growth, which is an essential factor in the preparation of good sol particles.

Since the rate of hydrolysis of ferric salts cannot be controlled in boiling (or hot) water (i.e., it proceeds briskly of its own accord without the addition of hydroxyl ions, removal of anions, or any of the other techniques used in the preparation of sols such as thoria and silica sols) control is obtained through slow addition of a cold solution of a ferric salt to boiling water.

While not wishing to be bound by theoretical explanation, it is believed that the strong acid released in the hydrolysis reaction is harmful to good particle formation; therefore, the inclusion of an acid neutralizing buffering agent such as ammonium acetate $$C_2H_3O_2^- + H^+ \rightarrow HC_2H_3O_2$$

to control the acidity of the solution is beneficial to good particle formation. The following overall reaction is believed to take place:

$$2FeCl_3+3H_2O+6NH_4Ac \xrightarrow{\Delta} Fe_2O_3+6HAc+6NH_4Cl$$

The procedure for employing our invention is as follows:

A solution of a ferric salt is prepared. The $Fe_2O_3$ content of the solution can vary considerably from 0.1% $Fe_2O_3$ up to the saturation point; concentrations of less than 1% $Fe_2O_3$, however, are inconveniently dilute. This solution is mixed with a solution of ammonium acetate. The mole ratio of $NH_4Ac/Fe$ should not exceed 3/1. This mixed solution is added slowly, dropwise, to a quantity of boiling water under reflux. The ferric salt-ammonium acetate solution is kept at room temperature during addition to the boiling water. The $Fe_2O_3$ content of the suspension when addition is complete can be varied but probably should not exceed about 10% $Fe_2O_3$. When the addition is complete the suspension is refluxed an additional period of time. This additional refluxing is not absolutely necessary but is beneficial to the particles. During addition and subsequent refluxing the suspension is stirred. The suspension is then allowed to cool to room temperature.

At this point the particles are heavily flocculated by the electrolyte and settle rapidly. After removal of the electrolyte, principally ammonium salt, the particles can be easily dispersed into a sol.

Removal of the electrolyte can be accomplished by many methods: (1) decanting the supernatant liquor after the particles have settled and replacing it with distilled water, (2) centrifuging and redispersing in distilled water and (3) by passing the sol from the first method through a mixed ion-exchange resin bed. The volume of water in which the particles are redispersed may be varied in accordance with the $Fe_2O_3$ content desired in the final sol.

The acetic acid can be recovered by conventional methods.

The following discussion pertains to the $Fe_2O_3$ particles after electrolyte removal. As long as the particles remain wet after they have been removed from suspension by centrifuging or other means, they are discrete and can be readily redispersed. If the particles are dried at room temperature a very fine-size powder results. A portion of the particles in this powder are loosely aggregated. This loose aggregation can be broken up by conventional techniques such as grinding after which the original discrete particles are obtained.

The particles produced by the above method are somewhat elongated spheroids in the 100 $m\mu$ size range. They are composed of much smaller particles bound together.

Acicular, or fibrous particles are produced by the same general procedure as that described above with the exception that dropwise addition of the ferric salt-ammonium acetate solution to boiling water is avoided; rather, all of the solutions are rapidly mixed. In this case, the $Fe_2O_3$ content of the final mixture should not exceed about 15%, and generally about 2% $Fe_2O_3$ is satisfactory. The ammonium acetate/Fe mole ratio should be about 3/1 or slightly less. The solution is refluxed with stirring for from 2 to 24 hours. Refluxing past 2 hours is not absolutely necessary but it improves the discreteness of the particles and tends to increase their length.

The particles produced by this invention are rod-like, averaging about 0.1 micron in length and 0.01 micron in width. Standard X-ray diffraction techniques identify the material as $\beta$-$Fe_2O_3 \cdot H_2O$.

The following two examples illustrate the procedure for producing acicular, fibrous particles, using the method described above.

*Example I*

60.8 gms. of $FeCl_3 \cdot 6H_2O$ were dissolved in about 200 ml. of $H_2O$. 47.3 gms. of ammonium acetate were dissolved in about 200 ml. of $H_2O$. The two solutions were mixed and diluted to a total of 800 ml. with $H_2O$. The solution was a deep red and clear. It was placed in a conventional glass reflux apparatus equipped with a stirrer and brought to a boil. The solution quickly became turbid. Samples were withdrawn and cooled to room temperature after 2 and 21 hours of refluxing and stirring. The samples were centrifuged until the supernatant liquor was clear after which the supernatant liquor was discarded. The particles were redispersed in water and an electron micrograph (200,000 magnification) made (FIG. 1). The particles were rod-like, acicular needles. The range of particle size was from 0.050 to 0.1 micron in length and 0.005 to .01 micron in width.

*Example II*

127 gms. of $FeCl_3 \cdot 6H_2O$ were dissolved in about 400 ml. of $H_2O$. 97.6 gms. of ammonium acetate were dissolved in about 300 ml. of $H_2O$. The two solutions were mixed and diluted to a total volume of 1500 ml. with $H_2O$. The resulting solution was refluxed with stirring for 18 hours. An electron micrograph of the particles formed showed essentially the same result as in Example II.

In both of the foregoing examples, standard X-ray diffraction patterns were made on the particles both as a wet slurry (before evaporating to dryness) and on the dried material. The material was identified as $\beta$-$Fe_2O_3 \cdot H_2O$ of small crystalline size.

The following examples illustrate the method for producing small, dense, discrete ferric oxide particles of elongated spheroidal shape.

*Example III*

Figure 2:
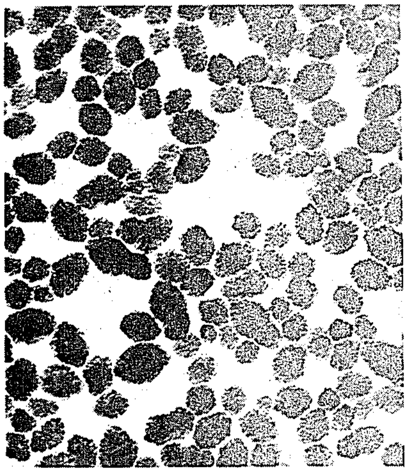

60.8 gms. of $FeCl_3 \cdot 6H_2O$ were dissolved in 150 mls. of water (0.225 mole of Fe). 47.2 gms. of ammonium acetate were dissolved in 150 mls. of water (0.612 mole of ammonium acetate). These two solutions were mixed and made up to 400 mls. with water. The resulting solution was a deep, clear reddish color. This solution, held at room temperature, was added dropwise to 400 mls. of boiling water containing 10 mls. of glacial acetic acid, in a reflux apparatus with constant stirring. After the addition was complete the suspension was refluxed an additional 19 hours with stirring, after which the stirrer was turned off and the suspension allowed to cool to room temperature. At this point, the particles were heavily flocculated by the electrolyte, $NH_4^+Cl^-$ principally, and settled out rapidly. The total $Fe_2O_3$ content was about 2.2%. The supernatant liquor was decanted and replaced with distilled water. The particles were redispersed into a colloidal suspension upon stirring. Better removal of electrolyte was accomplished by centrifuging a portion of the colloidal suspension, discarding the supernatant liquor, and redispersing the particles in distilled water. An electron micrograph was taken of the deionized colloidal suspension (FIG. 2). The particles were discrete, dense, somewhat elongated spheroids. Uniformity of size and shape was good. The mean particle size, measured on the long axis, was about 100 mμ and the size was from about 50 mμ to about 150 mμ.

A portion of the sol was centrifuged at 5000 r.p.m. for 30 minutes. The supernatant liquor was discarded and the particles dried at room temperature in a vacuum. These dried particles were given X-ray diffraction analysis which showed lines characteristic of $\alpha$-$Fe_2O_3$ hematite. The quality of the particles shown in electron micrographs taken before and after refluxing indicated that the additional 19 hours of refluxing was beneficial to the particles but not absolutely necessary.

*Example IV*

A portion of the suspension from Example III was centrifuged at 5,000 r.p.m. for 30 minutes. The supernatant liquor was discarded. The particles were placed in a vacuum desiccator overnight. The resulting powder was ground briefly (about 5 minutes) in a mortar and pestle. The ground powder was redispersed in water and an electron micrograph taken. Essentially the same particles as described in Example III were observed.

The following example is given for the purpose of comparing the results of our method with those of a standard method in the prior art in which no buffer is used.

*Example V*

Figure 3:
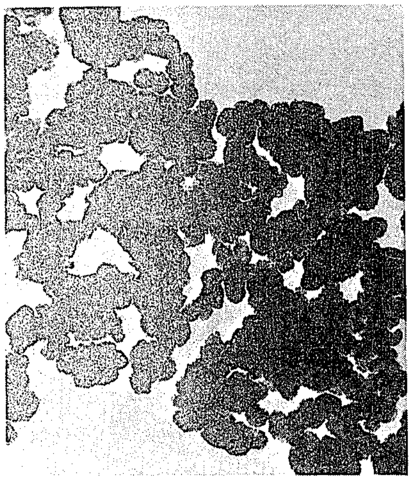

19.3 gms. of $FeCl_3 \cdot 6H_2O$ were dissolved in water and made up to 80 mls. This solution was added dropwise to 320 ml. of boiling water under reflux over a four-hour period. After the addition was complete the suspension was refluxed an additional two hours, after which it was allowed to cool to room temperature. The total $Fe_2O_3$ concentration was 1.4%. A portion of the suspension was centrifuged. The supernatant liquor was discarded. The particles thrown down were redispersed in water and an electron micrograph taken (FIG. 3). The micrograph showed nodular particles varying widely in shape, size, and particle density. The gross particles are loose aggregates of smaller particles. The gross particles vary greatly in size, the smallest being about 150 mμ and the largest being in the 500 mμ size range.

We claim:

1. A method for producing ferric oxide particles comprising preparing an aqueous solution containing ferric chloride in a quantity less than about 15 wt. percent, expressed as ferric oxide, and ammonium acetate in a quantity such that the ammonium acetate to Fe mole ratio does not exceed about 3 to 1; refluxing the solution for from 2 to 24 hours to induce good particle formation; and separating and drying the particles.

2. A method for producing alpha-ferric oxide particles having a uniform size and an elongated spheroidal shape comprising preparing an aqueous solution containing a ferric salt and a quantity of ammonium acetate such that the ammonium acetate to Fe mole ratio does not exceed about 3 to 1; adding a quantity of the solution dropwise to water under reflux conditions such that the final solution concentration does not exceed about 10 wt. percent of the ferric salt, expressed as ferric oxide; refluxing the solution for a time sufficient to provide good particle formation; and separating and drying the particles.

References Cited by the Examiner

UNITED STATES PATENTS

| | | | |
|---|---|---|---|
| 2,426,020 | 8/47 | Hauck | 252—313 XR |
| 2,694,656 | 11/54 | Camras | 23—200 XR |

OTHER REFERENCES

Weiser: Inorganic Colloid Chemistry, vol. II, The Hydrous Oxides and Hydroxides, Wiley & Sons, New York (1935), pages 46–49.

JULIUS GREENWALD, *Primary Examiner.*

ALBERT T. MEYERS, *Examiner.*